United States Patent [19]

Franklin

[11] 4,336,947
[45] Jun. 29, 1982

[54] WORKPIECE FEED DEVICES

[75] Inventor: Reginald A. Franklin, Witney, England

[73] Assignee: Crawford Collets Limited, Witney, England

[21] Appl. No.: 108,037

[22] Filed: Dec. 28, 1979

[30] Foreign Application Priority Data

Jan. 30, 1979 [GB] United Kingdom ................. 7903233

[51] Int. Cl.³ .............................................. B23B 5/22
[52] U.S. Cl. .................................. 279/46 A; 226/158; 226/167; 279/23 A
[58] Field of Search ............... 226/158, 162, 165, 167, 226/137, 147, 151, 120, 143; 279/1 SG, 23 A, 23 R, 41 A, 41 R, 46 A, 46 R, 102

[56] References Cited

U.S. PATENT DOCUMENTS 2,228,863 1/1941 Wright et al. .................... 279/46 A
2,680,623 6/1954 Hasselblad et al. .............. 279/46 A
2,829,899 4/1958 Drew et al. ....................... 279/41 R

*Primary Examiner*—Stanley N. Gilreath
*Attorney, Agent, or Firm*—Leydig, Voit, Osann, Mayer & Holt, Ltd.

[57] ABSTRACT

A feed device in the form of a feed finger for advancing a workpiece bar through a collet. The feed finger comprises a gripping sleeve with an internal bore in which the workpiece can be frictionally gripped. The sleeve is split into several segments each of which can be displaced radially-inwardly while remaining parallel to itself whereby to vary the effective cross-sectional size of the bore to enable the bore to receive workpieces of any cross-sectional size with a predetermined range.

6 Claims, 6 Drawing Figures

WORKPIECE FEED DEVICES

BACKGROUND OF THE INVENTION

1. Field of the Invention

The present invention relates to workpiece feed devices and more particularly to so-called feed fingers.

2. Description of the Prior Art

Feed fingers are conventionally used for advancing step-wise into a collet, a workpiece in the form of a long metal bar. The feed finger frictionally grips the bar and advances the bar forwardly into the collet while the collet jaws are open, until the required length of bar projects from the collet. The collet is then closed to rigidly clamp the bar and the feed finger is then retracted along the bar by sliding on the bar by a fixed distance. When the collet jaws are next opened the feed finger is moved forwardly again to index a further portion of the bar through the collet.

Previously proposed feed fingers generally comprise a sleeve-like gripping member which is split by axial slots extending along part of the length of the member. The gripping member, which is mounted on the work bar, is sized for use with one specific cross-sectional size of bar, which means that a different gripping member must be used for each size of the bar which is processed. Examples of such previously proposed feed fingers are described in British patent specifications Nos. 1 536 072; 1 529 571; 1 290 965; 1 165 872; and 867 909.

A requirement exists for a feed finger which can be used with different cross-sectional sizes of work bar.

SUMMARY OF THE INVENTION

According to the present invention, there is provided a feed finger comprising a gripping sleeve, said sleeve including means defining an internal bore in which the workpiece can be frictionally gripped, and said sleeve having opposed ends, said sleeve being split into several segments each of which can be displaced radially inwardly while remaining parallel to itself whereby to vary the effective cross-sectional size of the bore, and means co-operating with the gripping sleeve for applying a compressive force to the sleeve which acts to displace the segments inwardly against a resilient bias to define a selected cross-sectional bore size within a predetermined range.

BRIEF DESCRIPTION OF THE DRAWINGS

An embodiment of the invention will now be described, by way of example only, with reference to the accompanying diagrammatic drawings, in which.

DESCRIPTION OF THE PREFERRED EMBODIMENTS

Figure 1:
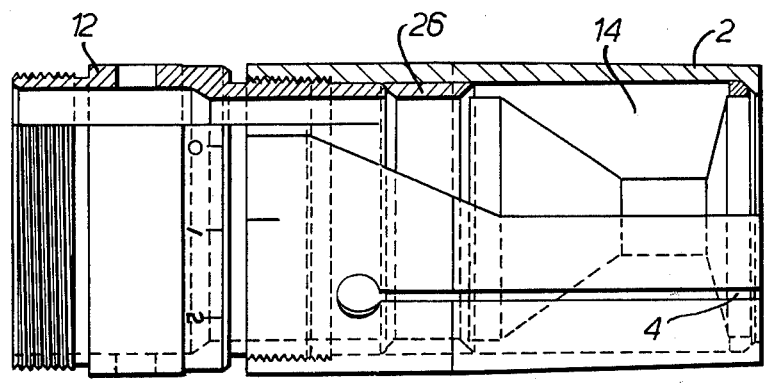
FIG. 1 is an axial cross-section of a feed finger in accordance with the present invention.
Figure 2:
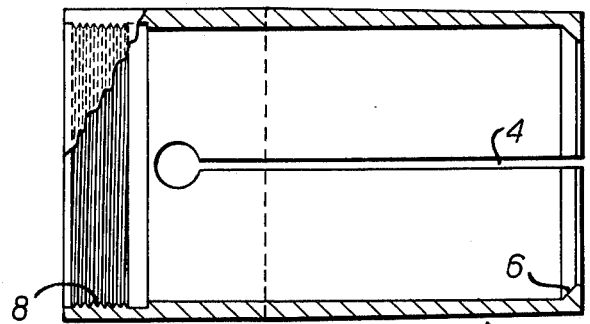
FIG. 2 is an axial cross-section of the body of the feed finger shown in FIG. 1.
Figure 5:
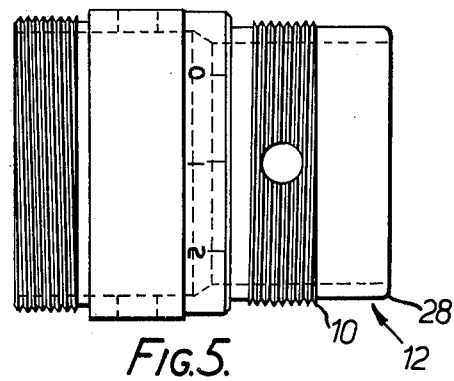
FIG. 5 is a side elevation of a screw-in tightening sleeve inserted into the rear end portion of the main body shown in FIG. 2.

The feed finger is shown in its assembled state in FIG. 1 and comprises a tubular body 2 having a number of axially-directed slots 4 (see FIGS. 1 and 2) extending along a substantial portion of the length of the body from its front end and which divide the body into a number of resilient segments. It is preferred that there are three such slots 4 spaced uniformly around the axis of the body. At its front end portion, the body 2 is formed with a conical seat 6 which projects inwardly from the bore of the body. The rear end portion of the body 2 is internally-threaded at 8 to receive an externally-threaded front end portion 10 of a tightening sleeve 12 (see FIGS. 1 and 5).

Figure 3:
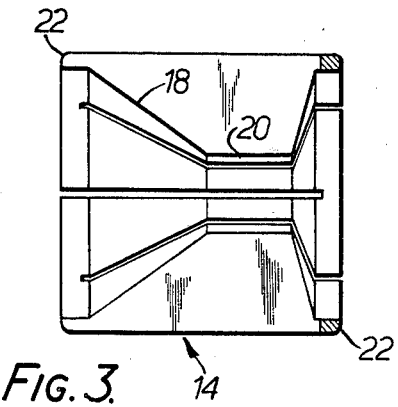
FIG. 3 is a diametral of an adjustable gripping insert mounted in the front end portion of the body, the section being taken on line 3—3 of FIG. 4.
Figure 4:
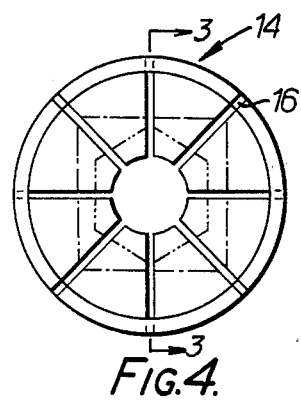
FIG. 4 is an end elevation of the gripping insert of FIG. 3.

The front end portion of the body 2 receives a gripping insert 14 which is likewise in the form of a sleeve and which serves to frictionally grip the work bar so that the bar can be advanced forwardly through the open jaws of a collet, when the feed finger is advanced forwardly. As shown in FIGS. 3 and 4, the sleeve which forms the insert 14 is provided at each end portion, with a thin-walled zone of limited axial extent. The sleeve 14 is split by several axially-directed slots 16. Each slot 16 has an open end opening onto an end face of the sleeve at one end of the sleeve and a closed end lying within the thin-walled zone at the other end of the sleeve with alternate slots 16 opening onto opposite ends of the sleeve. The slots 16 thus each extend over substantially the entire length of the sleeve and divide the sleeve 14 into segments and the above arrangement of the slots, and also the number of slots (as shown there are eight slots) permit the segments to move radially-inwardly so as to enable the internal bore size of the sleeve 14 to be reduced.

At its rear end portion, the internal bore of the sleeve 14 is formed with a conical lead-in 18 which reduces in diameter to that of a gripping portion 20 of the sleeve bore. The cross-sectional shape of the gripping portion 20 corresponds with that of the work bar with which the feed finger is to be used and for example may be circular, hexagonal, or square as indicated in FIG. 4. The gripping portion 20 is of constant cross-sectional size along its length in order to ensure that the entire length of this portion grips the work bar.

The alternating arrangement of the slots 16 with the slots extending over substantially the entire length of the sleeve, and the closed ends of the slots lying in a narrow thin-walled zone at an end of the sleeve as described above, ensures that the cross-sectional size of the gripping portion remains constant along its length, even when the segments of the sleeve 14 are displaced inwardly to reduce the internal bore size of the sleeve 14. The sleeve 14 shown in FIG. 4, in effect, may form a "blank" the clamping portion 20 of which can be enlarged radially (as shown in broken lines in FIG. 4) to produce a clamping portion of the required cross-sectional shape and dimension. The thin-walled zones at each end of the sleeve will remain uneffected by radial enlargement of the gripping portion.

Figure 6:
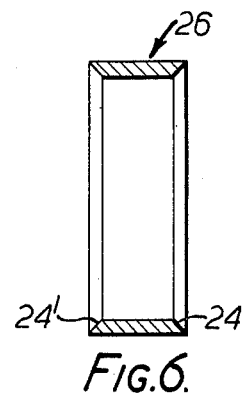
FIG. 6 is an axial cross-section of a spacer ring interposed between the tightening sleeve and the gripping insert.

The radially outer end edges of the gripping sleeve 14 are radiused as indicated at 22 in FIg. 3 and the front and the rear radiused end edges co-operate respectively with the conical seat 6 formed at the front end portion of the body 2 and with a conical seat 24 formed by a chamfer at the front end portion of a spacer ring 26 (see FIG. 6) which is located in the body 2 immediately behind the gripping sleeve 14. The spacer ring 26 also has a similar conical seat 24' at its rear end portion and which cooperates with a radiused front end edge 28 of the tightening sleeve 12.

In use, the tightening sleeve 12 is screwed into the rear end portion of the body 2 so that the gripping sleeve 14 is compressed between the conical seat 6 at the front end portion of the body 2 and the conical seat 24 at the front end portion of the spacer ring 26. As the compressive loading increases, these conical surfaces ride outwardly over the radiused end edges 22 of the gripping sleeve 14 so that the segments of the gripping sleeve 14 are displaced radially inwardly whereby to enable the cross-section of the gripping portion 20 of the sleeve 14 to be adjusted to suit different sizes of work bar. As the conical seat 6 at the front end portion of the body 2 rides over the radiused front end edges 22 of the sleeve 14, the individual segments of the body 2 which are defined between the adjacent slots 4 are resiliently deflected radially outwardly and this deflection causes the gripping portion 20 of the sleeve 14 to exert a resilient gripping action on the work bar.

The internal diameter of the gripping portion 20 of the gripping sleeve 14 can be adjusted to suit any cross-sectional size of work bar within a given range. By way of example, on a nominal bar size of 30 mm diameter, the diameter of the gripping portion 20 of the sleeve 14 may be adjusted over a range of 1 mm. Apart from enabling a range of bar sizes to be handled by a particular gripping sleeve, the adjustment will also enable the clamping force which can be exerted on any given work bar to be varied according to requirements; for example, when feeding a light aluminium bar of given size, a much smaller frictional clamping force will be required than for feeding a steel bar of the same size.

The feed finger particularly described can be used with bars of different size ranges and different cross-sectional shape merely by replacing the gripping sleeve 14 with another sleeve appropriate to the size range and cross-section to be processed. Further a range of sleeves 14 in different materials can be provided so that an appropriate sleeve 14 can be selected according to the material from which the work bar is made so as to ensure that the sleeve 14 does not scratch or otherwise damage the surface of the work bar when it is slid along the work bar during retraction of the feed finger; for example, the sleeve 14 may be made from phosphor bronze, steel or a plastics such as nylon.

The adjustability of the gripping diameter of the gripping portion 20 together with the resilient gripping action means of the finger can be used with work bars which are "out of round," for example so-called "as-rolled" steel bars which have been accurately sized.

The radiused end edges 22 of the sleeve 14 which co-operate with the conical seats 6 and 24 permit a slight rocking movement of the sleeve 14 whereby the sleeve 14 is, in effect, self-aligning during insertion of the work bar. Finally, it is to be noted that despite the adjustability of the sleeve 14, it will always grip the work bar along the entire length of its gripping portion 20, and not just at one end of the gripping portion.

What is claimed is:

1. A feed finger comprising a gripping sleeve, said sleeve including opposed axial end portions, means defining a thin-walled zone of limited axial extent at each axial end portion of the sleeve, an inwardly-projecting thick-walled zone intermediate said thin-walled zones and defining an internal bore in which the workpiece can be frictionally gripped, and means defining a series of angularly-spaced slots which split the sleeve into segments, each said slot extending axially of the sleeve over substantially the entire length of the sleeve, each slot having an open end opening onto one end of the sleeve and a closed end lying within the thin-walled zone at the other end of the sleeve, alternate slots opening into opposite ends of the sleeve, and means co-operating with the gripping sleeve for applying to each end of the sleeve a radially inwardly-directed compressive force which acts to displace the segments radially inwardly against a resilient bias to define a selected cross-sectional bore size within a predetermined range, each said segment when moving inwardly remaining parallel to itself.

2. A feed finger according to claim 1 wherein the means for applying a radially-inwardly directed compressive force to each end of the sleeve comprises a tubular body, said sleeve being mounted in the tubular body, said body including a radially-inclined surface rigid therewith, and said feed finger further comprising means defining a radially-inclined surface movable axially relatively to the body, said sleeve having a radially-outer edge portion at one end of the sleeve co-operating with said radially-inclined surface rigid with the body, and a radially-outer edge portion at the other end of the sleeve co-operating with said movable radially-inclined surface, and means for displacing said movable surface axially towards the said surface rigid with the body, whereby upon such axial movement, the inclined surface cause the segments of the sleeve to be moved radially-inwardly.

3. A feed finger according to claim 2, wherein the said radially-inclined surfaces are conical and the radially-outer edge portions of the sleeve are radiused.

4. A feed finger according to claim 3, wherein the means for displacing the movable surface comprises a sleeve-like member threadedly mounted on the body.

5. A feed finger according to claim 2, wherein the tubular body includes a resilient portion carrying the said surface rigid with the body, said resilient body being resiliently enlarged radially upon radial contraction of the gripping sleeve under the action of the forces produced between the inclined surfaces and the radially-outer edge portions of the sleeve.

6. A feed finger according to claim 5, wherein said resilient body portion is provided by slitting the body to form a plurality of radially movable segments.

* * * * *